United States Patent
Welbourn et al.

[15] 3,702,043
[45] Nov. 7, 1972

[54] LAPPING, HONING OR THE LIKE MACHINES

[72] Inventors: Donald Burkewood Welbourn; James Derek Smith, both of Cambridge; Bruce Robert Ashworth Buckley, Leeds, all of England

[73] Assignee: C.A.V. Limited, Birmingham, England

[22] Filed: Dec. 10, 1970

[21] Appl. No.: 96,954

[30] Foreign Application Priority Data

Dec. 11, 1969   Great Britain..........60,437/69

[52] U.S. Cl..............51/92 R, 51/165.77, 51/165.93
[51] Int. Cl........B24b 5/00, B24b 49/00, B24b 5/00
[58] Field of Search.............51/92 R, 165.77, 165.93

[56] References Cited

UNITED STATES PATENTS 3,404,490   10/1968   Estabrook..............51/165.93
3,247,622   4/1966   Hackman................51/92 R X
3,466,809   9/1969   Estabrook..............51/165.77

Primary Examiner—Othell M. Simpson
Attorney—Holman & Stern

[57] ABSTRACT

A machine for removing material from an internal surface of a workpiece and comprising a workpiece holder which is reciprocably mounted upon a support structure, a tool supporting member in the form of a spindle, the tool supporting member being driven by a motor means and the tool being mounted upon the spindle and connected to an actuator whereby the effective size of the tool can be adjusted. The workpiece holder includes a member which restrains angular movement of the holder and the member mounts a strain gauge whereby a signal can be obtained indicative of the cutting load exerted by the tool upon the workpiece.

11 Claims, 6 Drawing Figures

PATENTED NOV 7 1972

INVENTOR
Donald Burkewood Welbourn, James Derek Smith & Bruce Robert Ashworth Buckley
Holman & Stern
ATTORNEYS

LAPPING, HONING OR THE LIKE MACHINES

This invention relates to a machine for the removal of material from an internal surface of a workpiece by means of an abrading tool brought into contact with the workpiece.

The invention is applicable to lapping, honing or other machines including an abrading tool with which, when the machine is in use, the internal surface of the workpiece is in contact and relative movement is effected between the tool and the workpiece parallel to said surface, while relative feed movement between the tool and workpiece is effected by expansion of the effective diameter of the tool, and/or in some cases by relative radial displacement between the tool and workpiece with respect to an axis about which rotation is effected to produce said relative movement parallel to said surface.

The machine has been developed in relation to a requirement to produce an accurate right cylindrical bore in a liquid fuel injection nozzle for an internal combustion engine. Such bore is closed or blind at one end, and for the purpose of obtaining the required finish on the internal surface of the bore, as well as the required degree of accuracy as to circularity and parallelism in respect of the radial dimensions of the bore throughout its length, the existing practice is for the bore to be lapped by hand.

For this purpose an approximately cylindrical lap (slightly tapered and split longitudinally) has been employed, such lap being provided with means for effecting expansion, and when in use has been coated with an abrasive paste. The person performing the lapping operation can sense "tight" spots and continues lapping by manual axial reciprocation of the nozzle on the lap (while the lap is held in a rotating motor-driven chuck or head) until such "tight" spots are eliminated.

The operation is time-consuming and requires the services of skilled personnel and both these factors contribute materially to the production cost of the nozzle.

The object of the present invention is to provide a lapping machine capable of use satisfactorily to perform the above mentioned operation, and capable of use also where similar or analogous requirements arise in respect of abrading internal surfaces.

According to the present invention there is provided a machine of the kind specified which comprises a body or supporting structure on which is mounted a lap, hone or other tool supporting member and a work supporting member, said members being in such relative positions as to allow the lap, hone or other abrading tool, when carried by the tool supporting member, to be in co-axial relation with said surface of the workpiece when carried by the work supporting member, means for effecting relative rotation about the axis of the tool between said members, means for effecting relative axial reciprocation between said members, sensing means for sensing the resistance to relative movement between the tool and the surface of the bore, and for developing a primary signal having a magnitude dependent upon the magnitude of said resistance, and means for adjusting the effective diameter or relative radial position of the tool with reference to said primary signal.

The sensing means and the means for adjusting the effective diameter or relative radial position of the tool are advantageously of such form or construction as to provide substantially instantaneous response to change the effective diameter or relative radial position of the tool upon sensing of any departure from one or more pre-determined reference signals or quantities with which the signal developed by the sensing means is compared in a comparator provided for this purpose.

For certain classes of work, it would be within the scope of the invention to provide display or indicating means furnishing an indication of the resistance to relative movement between the workpiece and the tool at different relative positions along the path of relative reciprocation between the workpiece and the tool, the means for adjusting the effective diameter of the tool being operable manually by an operator in accordance with the indication or display derived from the primary signal.

It is preferred, however, that the machine shall include a programme controlling means which receives the primary signal and develops at least a first output signal for operating or controlling operation of the means for adjusting the effective diameter or relative radial position of the tool. The programme controlling means may also develop a second output signal for terminating further abrading of the workpiece upon attainment of predetermined conditions as sensed by the sensing means, for example uniformity within predetermined limits of the primary signal throughout the path of relative reciprocation between the tool and the workpiece at a given effective diameter or relative radial position of the tool.

In one form of machine, in accordance with the invention, one of the two members, namely the tool supporting member and the workpiece supporting member, is mounted on the body or supporting structure for rotation about said axis, and is operatively connected with a driving motor for effecting such rotation, whilst the other member is restrained against rotation about said axis but is mounted on the body or supporting structure for reciprocation longitudinally of said axis, and the sensing means is operatively associated with the reciprocable one of said members. Reciprocation of this member may be effected by mounting it on a carriage movable longitudinally of said axis relatively to the body or supporting structure, and the sensing means may comprise a torque sensing gauge or load cell operatively connected between the reciprocable member and the carriage on which it is mounted, which gauge or cell is subjected to stress in response to torque transmitted to this member about said axis, in consequence of engagement between the tool and the internal surface of the bore undergoing abrading.

The preferred form of sensing means is an electrical strain gauge.

A further important feature of the invention is that the means for adjusting the effective diameter or relative radial position of the tool preferably includes an actuating device or motor, which is power energized from a source independently of any driving motor utilized to effect relative movement between the tool and the workpiece, such actuating device or motor being adapted to be brought into operation in response to said first output signal developed in the programme controlling means.

The actuating device or motor of the adjustment means for adjusting the effective diameter or relative radial position of the tool is preferably so constructed or arranged as to provide for an adjustment step or rate of adjustment of the effective diameter or relative radial position co-related with the primary signal according to a predetermined relation determined by the programme controlling means. Such actuating device or motor preferably also provides for both precisely controlled increase in the effective diameter or outward relative radial movement, and precisely controlled decrease in the effective diameter or inward relative radial movement of the tool at any stage during a complete cycle of operation of abrading a workpiece.

The preferred form of actuating device or motor is a device actuated hydraulically, in which case the programme controlling means would then include a valve means operated in accordance with the magnitude of the primary signal (and such other programme determining signals as may be fed into the programme controlling means) to bring about adjustment in the effective diameter or relative radial position of the tool in precisely determined discrete steps or continuously at a precisely determined rate as may be required in any particular case.

The means for adjusting the effective diameter of the tool may comprise an expansion element disposed in the interior of a hollow tool and movable axially therein to adjust the effective diameter presented by the exterior surface of the tool, such element being connected to an operating rod extending co-axially of the axis of rotation and operatively connected with the movable element of a hydraulic piston and cylinder assembly, the supply of hydraulic fluid to which is controlled in accordance with the primary signal developed by said sensing means, preferably through the intermediary of a programme controlling means as already mentioned.

If it is convenient, as is often the case, for the supporting member for the tool to be the rotatable one of said members, and for the supporting member for the workpiece to be the non-rotatable, but axially reciprocated, one of said members, the particular form of actuating device or motor for adjusting the effective diameter of the tool would then be operatively connected with the operating rod through the intermediary of a rotating joint structure including means for transmitting axial thrust loads to the rod, the hydraulic piston and cylinder assembly being non-rotatably mounted on the body or supporting structure of the machine.

Referring now to the general preferred form of the programme controlling means, this may comprise an electrical circuit including an electrical comparison circuit in which a primary electrical signal developed by the sensing means is compared with a datum electrical signal to provide a secondary signal fed to one or more further circuits to develop an output signal for effecting or controlling operation of the adjusting means for effective tool diameter or relative radial position, either to increase or decrease this diameter, according to whether the difference between the primary signal and the datum signal is below or above a predetermined value.

Alternatively the programme controlling means may comprise a fluidic circuit incorporating appropriate fluidic logic elements arranged to provide an output signal varying as a function of an input signal as above, described relatively to the electrical comparison circuit. A mechanical programme controlling means is also possible.

The invention will now be described, by way of example, with reference to the accompanying drawings wherein.

It will be understood that although the following description discloses, by way of example, a lapping machine substantially the same construction and arrangement, as well as substantially the same programme controlling means, may be employed for a honing machine. The hone would include a body from which extend radially projecting stones or abrading elements, the outer surfaces of which provide the effective diameter of the hone. The means for expanding the stones or elements may be similar to that provided for expanding the lap.

Figure 1:
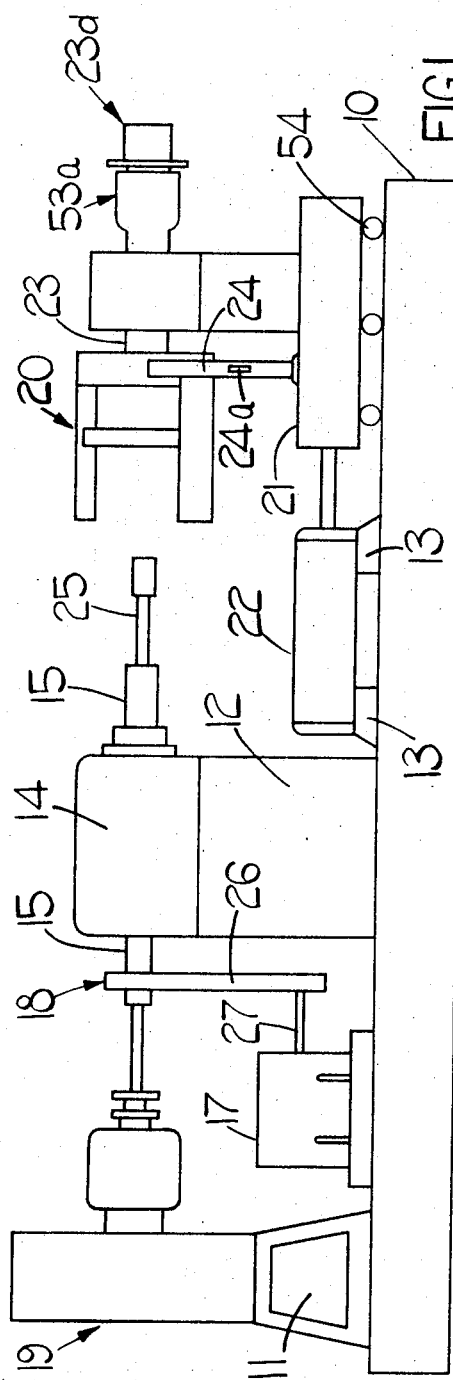
FIG. 1 is a view in side elevation showing the general arrangement of parts of one example of a lapping machine in accordance with the present invention.

Referring firstly to FIG. 1, the machine comprises any suitable form of body or supporting structure and as seen this includes a base plate 10 on which are mounted a number of pedestals or brackets 11, 12 and 13 for supporting the working parts of the machine, as hereinafter described.

These working parts include a lap supporting member 14 having a rotary spindle 15 which carries the lap and is driven rotatably about an axis by a motor 17 through transmission means 18.

Expansion and contraction of the lap is effected by means of an actuating device 19 assembled co-axially with the axis of the spindle.

A workpiece supporting member 20 arranged co-axially with the axis of the spindle is supported on a reciprocating carriage 21 which can be reciprocated by a hydraulic piston and cylinder unit 22 parallel to the axis of the spindle, the workpiece support being restrained against rotation about the axis by a structure 24 which includes a sensing means 24a for sensing the torque developed at the work support upon engagement between a workpiece and a lap 25.

Figure 2:
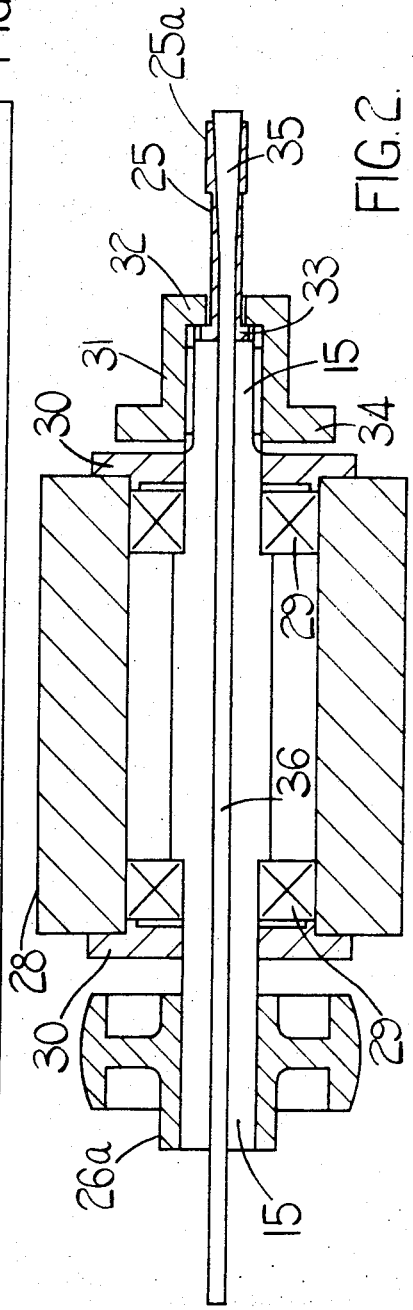
FIG. 2 is a fragmentary view in diametral cross-section through the axis of relative rotation and reciprocation of the lap and workpiece, and on an enlarged scale showing the lap supporting member.

Referring specifically to the lap supporting member, as seen in more detail in FIG. 2, this comprises the spindle 15 through which extends a co-axial bore and which carries at its rearward end a pulley 26a conveniently of a form suitable to be driven by a belt 26 which may be toothed or of other suitable form engaged around a further pulley fast on the shaft 27 of (electric) motor 17.

The spindle 15 is supported in a housing 28 by axially spaced bearings 29 of the ball or roller type designed to bear both radial and axial loads and enclosed axially by cover plates 30. At its forward end the spindle 15 is screw-threaded externally and carries a screw-threaded cap 31 having a radially inwardly projecting flange 32 at its forward end to enable the flange 33 of the lap 25 to be gripped between the flange 32 and the end face of the spindle 15 when the cap is tightened. For the latter purpose a radially outwardly projecting flange 34 is provided which may be knurled, formed with polybar holes or made of hexagonal or other suitable shape to be tightened by a spanner.

The lap 25 is of conventional construction and is of generally tubular form and may be split longitudinally at one position along the whole of its length, or possibly split over part of its length at a plurality of preferably equally angularly spaced positions. The lap is thus capable of expansion and contraction to vary the effective diameter presented by the exterior surface of the portion 25a at the end of the lap and which constitutes the lapping surface proper. It will be noted that the surface portion 25a is of somewhat greater diameter than the remaining portion.

The internal surface of the lap is of tapering form having its largest diameter adjacent to the forward end of the lap, and contains an expansion element 35 in the form of a frustoconical end portion or head which is movable axially in the lap. The inherent resilience of the latter allows the lap to contract when the element 35 is moved to the right, as seen in FIG. 2, and the lap is positively expanded when the element 35 is moved to the left.

For this purpose the element 35 may be formed integrally with, or connected to, an operating rod 36 extending through the bore of the spindle 15, and movable axially by means of the actuating device 19.

Figure 3:
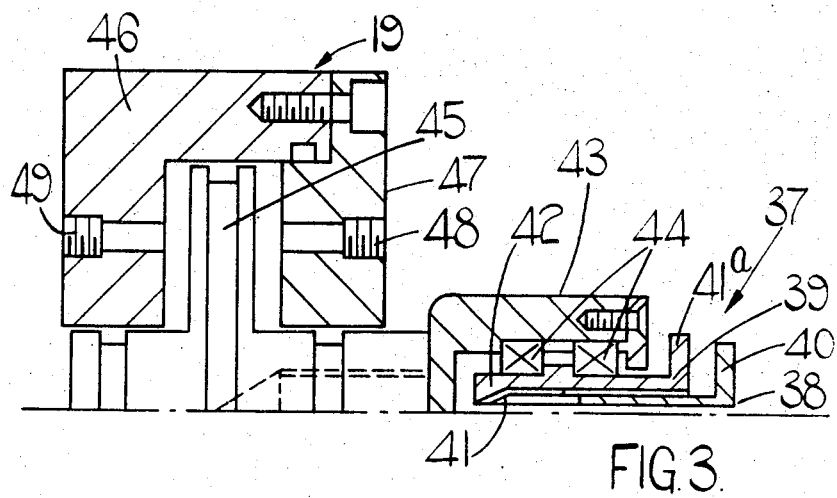
FIG. 3 is a half section in the same plane and on the same scale as FIG. 2 showing the construction of the actuating device or motor for operating the means for adjusting the effective diameter of the lap.

Referring now to FIG. 3 wherein this device is seen in greater detail, it comprises a gripping means 37 which conveniently may be an inner longitudinally split collet 38 contained in an outer sleeve 39, both having flanges 40 and 41a respectively at their right-hand ends. The peripheries of these flanges may be knurled, formed to hexagonal or other suitable shape for engagement by a spanner, or formed with tommy bar holes as desired, the outer sleeve being screw-threaded internally and the collet 38 threaded externally so that, upon screwing in the collet, co-operation of a conical surface 41 at the inner end thereof, with a complementary conical surface 42 on the sleeve 39, provide for contraction of the collet to grip the operating rod 36.

The assembly of sleeve and collet is supported in a housing 43 through the intermediary of thrust bearings 44 which may be of the ball or roller type. The housing 43 is formed integrally with, or secured to, the piston 45 of the device 19 which is a hydraulic piston and cylinder assembly, the cylinder whereof comprises the components 46 and 47 provided with ports 48 and 49 by means of which hydraulic fluid can be supplied to, or exhausted from, the cylinder to produce movement of the piston 45 in the desired direction.

Figure 4:
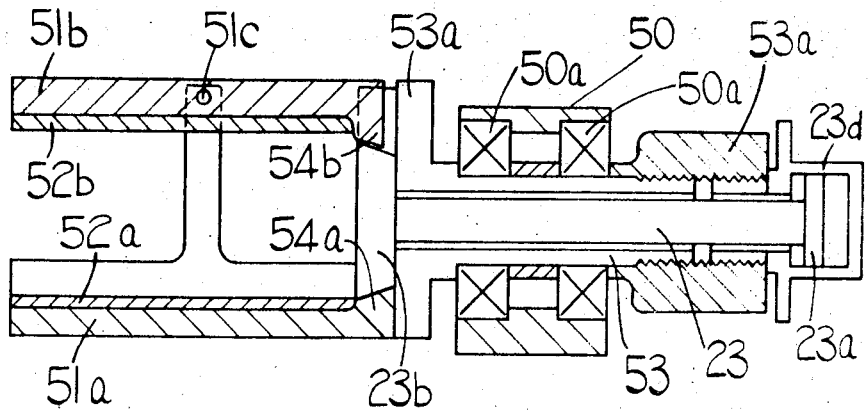
FIG. 4 is a cross-sectional view in the same plane as FIGS. 2 and 3 showing construction of the workpiece holder.
Figure 5:
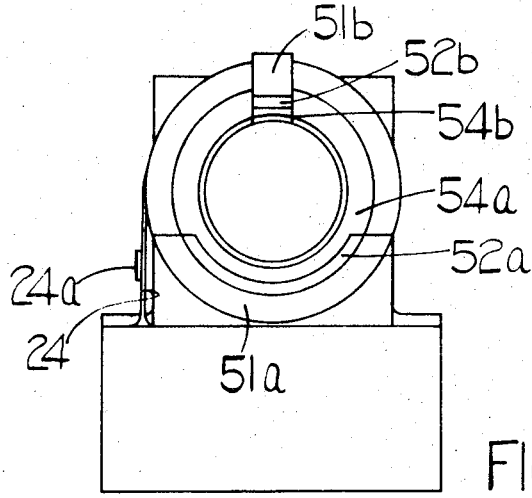
FIG. 5 is a view in end elevation of the workpiece holder showing the sensing means thereof.

Referring now to the workpiece supporting member, as seen in FIG. 4, this comprises a tubular spindle 53 supported in a housing 50 through the intermediary of thrust bearings 50a which may be of the ball or roller type and adapted to bear radial and axial loads. The spindle carries at its end nearest the lap supporting member 20 a holder for the workpiece comprising opposed jaw members 51a, 51b, of which the former is of part annular form and the latter of bar-like form. Each jaw member is provided, in its interior surface with a means for yieldably gripping the workpiece, such as a fuel injection nozzle already mentioned. These means may comprise linings 52a, 52b of resilient material which grip the nozzle sufficiently firmly to prevent rotation relatively to the chamber but allow angular deviation between the axis of the nozzle and the axis 16 about which the lap rotates. Alternatively any mechanical means, such as a cardanic or gimbal suspension, may be provided to allow the necessary degree of freedom, whilst restraining motion about or along axis 16.

The spindle 53 is restrained against rotation by the torque anchor device 24 already mentioned, which includes a sensing element in the form of an electrical strain gauge 24a, such device 24 being conveniently anchored between the flange 53a of the spindle and the carriage 21 on which the workpiece supporting member is mounted.

For rocking the jaw 51b about its pivotal connection 51c to grip and release the workpiece, an inner shaft 23 movable axially has a frusto-conical head 23b co-operating with the inner faces of inwardly projecting parts 54a and 54b on the jaws. The shaft 23 is moved by a piston 23a in a hydraulic cylinder 23d having a threaded spigot screwing into bush member 53a which, in turn, is rigidly screwed onto spindle 53. Alternatively, bush member 53a may be moved to the right (as shown in FIG. 4) by a spring, when the nozzle is to be gripped, and moved to the left by a separate hydraulic ram, anchored on the base 10, thereby overcoming the spring when nozzle release is required.

The carriage 21 may be mounted in slideways on the base 10, preferably through the intermediary of roller or ball elements indicated diagrammatically in FIG. 1 at 54, or through any precision type of bearing, including hydro-static or air bearings.

When the lap 25 is driven rotatably by a motor 17, and the hydraulic piston and cylinder unit 22 is operated to produce reciprocation of the carriage 21, the workpiece supporting member, and in particular the jaws 51a 51b and spindle, tends to turn within the limits permitted by the torque anchor device 24 producing straining of the sensing means 24a to an extent dependent upon the magnitude of the torque. A sensing means in the form of an electrical strain gauge thus produces an electrical signal (the primary signal hereinbefore mentioned) which is utilized to control the effective diameter of the lap throughout the cycle of operations on a given workpiece by controlling the admission of hydraulic fluid to the ports 48 and 49 of the device 19.

For this purpose a programme control means is provided. This comprises a number of electrical circuits together with hydraulic elements, such as valve means, controlling the supply of hydraulic fluid to the units 19 and 22.

Figure 6:
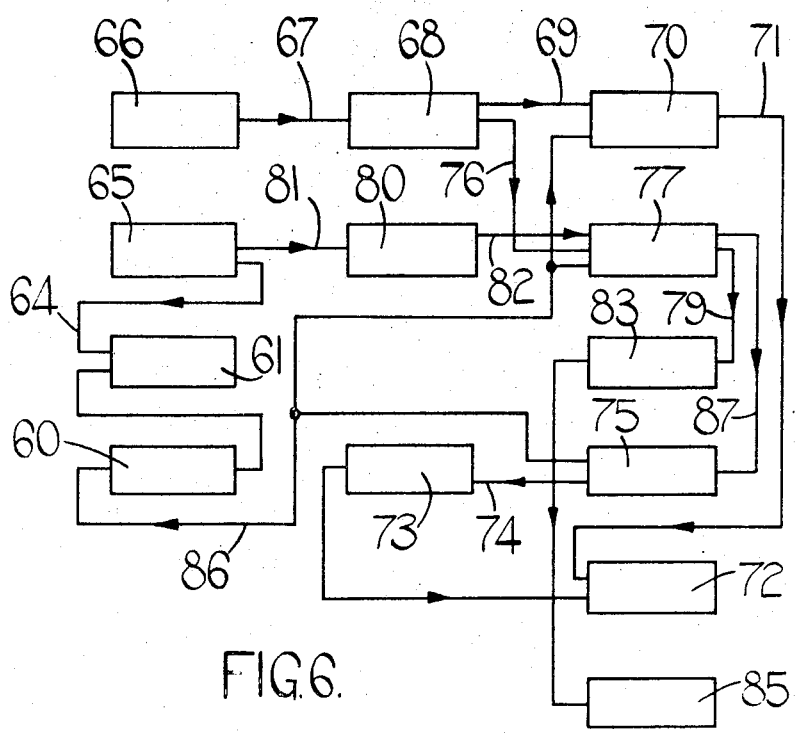
FIG. 6 is a schematic circuit diagram showing the programme controlling means of the mechine.

One suitable form of programme control means is illustrated in FIG. 6 which will be best understood by a description of the sequence of operations involved in the performance of a complete lapping operation of a given workpiece.

At the beginning of the cycle it is assumed that the lap 25 is in a fully contracted position and is withdrawn from the workpiece.

The cycle of operations is initiated by an electrical signal produced, for example, by manual operation of a switch in a start/stop control circuit 60 which feeds an output signal to a reciprocation control circuit 61 which energizes a solenoid operated valve. The latter is set in a position to supply hydraulic fluid to the piston and cylinder unit 22, to move the carriage 21 to the left as seen in FIG. 1, and bring a workpiece contained in the workpiece supporting member 23 into longitudinally overlapping relation with the lap 25. In FIG. 6 the solenoid valve is considered as included in the circuit 61. As a result of carriage displacement, the latter actuates a micro switch system represented by circuit 65, at the extremities of travel. It will be understood that the micro switches contained in this system are preferably adjustable in position on the body or supporting structure of the machine to enable the magnitude of reciprocation and the terminal positions to be adjusted as required. An output is fed back, as indicated by the arrow 64, to the reciprocation control circuit 61 to bring about reversal of the position of the solenoid valve at the ends of the stroke.

It will be understood that the outer surface of the lap will have been coated with an abrasive paste and, upon entry of the lap into the workpiece (the lap being at its minimum diameter), only a very slight torque, if any, will be generated due to contact between the paste layer and the internal surface of the workpiece, and that consequently a low or zero value of the primary signal developed in the strain gauge measuring circuit 66 will be applied, as indicated by the arrow 67, to a torque level comparator circuit 68.

This circuit includes means for setting two predetermined datum torque values with which the incoming primary signal is compared. When the incoming signal is less than the first (lowest) predetermined datum value no output is passed from the circuit 68 along line 69, to a peak cycle torque memory circuit 70. This circuit sends a signal along line 71 to the lap expansion control valve circuit 72. This controls a solenoid operated valve settable in either a closed position in which no fluid is admitted to the actuating device 19, or alternatively in an open position appropriate to supply fluid to the port 48 and exhaust fluid from the port 49 to expand the lap, or alternatively an open position in which fluid is supplied to the port 49 and exhausted from the port 48 to contract the lap.

Accordingly the lap is continuously expanded at a fast rate until it reaches an effective diameter at which appreciable frictional and cutting resistance is established through the paste layer between the surface of the lap and the surface of the bore.

Under these conditions the strain gauge senses a value of torque above the first datum level, and an output signal developed from the comparator 68 is sent along line 69 to trigger the peak cycle torque memory circuit 70 and stop the fast lap expansion signal 71.

When the incoming torque signal is less than the second (normal) predetermined datum no output is passed from the circuit 68, as indicated along the line 76, to the peak stroke torque memory circuit 77. This circuit sends a "slow" lap expand signal along line 79 to the expansion pulse timer 83 once every stroke of reciprocation as given by the signal passing from position memory circuit 80 along line 82. The expansion pulse timer 83 gives a signal along line 84 for a predetermined time to the lap expansion control valve (slow rate) 85 to give a single small increment of expansion of the lap. The lap expansion control valves 72 and 85 may be separate, or one and the same valve.

Accordingly the lap is expanded in small, precisely controlled, increments until it reaches an effective diameter at which the lapping process cutting resistance reaches the second (normal) predetermined datum.

Under these conditions the strain gauge senses a value of torque above the second datum and an output signal is developed from the comparator 68 which is sent along line 76 to trigger the peak stroke torque memory 77 to stop the slow lap expansion signal on line 79.

After the peak stroke memory 77 has been thus triggered, lapping continues with no further change of lap size until the cycle finish signal from timer 75 terminates the process. Alternatively, and preferably, the peak stroke torque memory 77 may be reset by the signal on line 82 each reciprocation of the nozzle. If then the maximum torque signal on line 67 during a single reciprocation does not reach the second (normal) predetermined level, the peak stroke torque memory 77 will develop a lap expand signal on line 79 which is fed to the timer 83 to give a single expansion increment of the lap. Expansion of the lap will occur until the torque signal on line 67 again exceeds the second datum level.

The peak stroke torque memory 77, when triggered, also sends a start signal on line 78 to the lapping cycle timer 75. The timer 75 develops a timing signal which allows operation to continue for a predetermined period before a stop signal is fed along line 86 to the stop/start control circuit 60. The incidence of a stop signal will cause the piston and cylinder unit to cease operation at the end of a stroke with the workpiece completely withdrawn from the lap 25. The cycle finish signal from circuit 75 also starts the lap reduction timer 73. This provides a signal to the fast rate lap expansion control valve 72 for a predetermined time. This signal gives a lap size reduction sufficient to allow the lap to enter the next nozzle to be lapped without interference between nozzle and lap.

During reciprocation of the unit 22 for effecting lapping, the stroke may be shortened so that the lap is withdrawn from the workpiece by a distance such that about one half to two thirds of its length is withdrawn.

The following possible modifications of the apparatus are mentioned by way of example and not in a limiting sense.

The programme controlling circuit may include a circuit which compares the magnitude of the torque reaction signal developed by the strain gauge measuring circuit 66 with a signal representing the time of one stroke of the reciprocation, or the position of the workpiece supporting member from one of its terminal positions, so that, in effect, a resultant plot of torque resistance is obtained as a function of time or distance travelled along the stroke of reciprocation. This permits of determination of the axial position of "tight" spots and such position determination may be utilized to effect lapping of the workpiece locally in the region of the "tight" spot to produce greater uniformity as to the parallelism of the bore. This modification would entail the provision of a lap which is axially shorter than the length of the bore to be lapped, so as to permit of local lapping of a tight spot without contact being made between the surface of the bore and the lap over remaining parts of the former.

Again, it would be possible to sense resistance to relative movement between the lap and the surface of the bore by measuring the torque reaction at some suitable position on the lap supporting member or the means for rotating same. For example, the spindle 15 could include relatively rotatable portions, one connected operatively with the driving motor, and one supporting the lap, and movable angularly relatively to each other against biasing means, e.g. either hydraulic or spring, with which is associated a sensing means to determine the extent to which the relatively rotatable parts have moved away from a datum position. Alternatively, in some cases, it may be adequate to sense values of electrical current in a winding of the motor wherein the current varies as a function of the load torque. Alternatively a strain gauge may be fitted to the rotating shaft. The latter may have slip rings to convey the electrical signal from the strain gauge to an external circuit.

Alternatively the motor may be carried by a mounting similar to the mounting provided for the workpiece supporting member and incorporating a strain gauge which measures torque reaction on the motor casing.

It is however, preferred that the sensing means be associated operatively with the non-rotating member, that is the workpiece supporting member in the present construction, so that the signal developed by the sensing means does not have random components superimposed upon it due, for example, to changes in the frictional resistance afforded by the bearings in the housing 14 as a function of temperature or as a function of the time for which the machine has been operating, from an idle or "cold" state.

Referring to the actuating device for effecting lap expansion, this may be replaced by a rotary motor, either pressure fluid, such as air, or an electric motor, and the operating rod may then have screw thread means cooperating with nut means to move the rod axially to effect expansion and contraction of the lap. Alternatively the lap itself may be formed as a hollow chamber capable of being expanded and contracted by the supply thereto of a fluid under pressure in its interior space. In this case the lap may be made of a flexible elastically expansible material and may be provided at its outer surface with a cover member for carrying the paste, so as to minimize wear and tear on the lap proper.

Further, instead of providing in the programme control circuit a timing device for generating a stop signal to bring the complete lapping operation to an end, the length of the cycle may be controlled by measurement of lap expansion, for example by measurement of the quantity of hydraulic fluid supplied to the actuating device from a given stage, for example, that in which the lap is fully contracted or that in which the lap first contacts the internal surface of the bore.

Additionally, if desired, the programme control circuit may include means for setting the lap at an effective diameter to provide for a polishing or finishing operation as the final stage of the complete lapping operation, this being effected at a low torque value as, for example, may be achieved by providing a third lap expansion control valve circuit in which expansion of the lap would take place at increments smaller than those provided by the circuit 85. Alternatively, the lap could remain at a predetermined effective diameter during this operation.

Another modification which may be made is that, instead of expanding the lap by fixed increments periodically, that is once per stroke or once per predetermined number of strokes, as is contemplated will be the case using the circuit of FIG. 6, slow rate lap expansion may be effected continuously. The rate of expansion may be controlled as a function of the difference signal between the primary signal fed into the torque level comparater circuit 68 and the datum value provided by this circuit.

This would require provision of a motorized regulating valve settable to an appropriate position as a function of the output from the circuit 68.

A further feature which may be incorporated, if desired, is the provision of means for varying the speed of relative rotation between the lap supporting member and the workpiece supporting member.

For this purpose the operative connection between the drive motor 17 and the spindle 15 may be effected through the transmission means providing for variable velocity ratio, preferably adjustable steplessly. Alternatively the motor 17 may be of the variable speed type and controlled by an appropriate control circuit.

Having thus described our invention what we claim as new and desire to secure by Letters Patent is:

1. A machine for removing material from an internal surface of a workpiece, comprising a supporting structure, a rotatable tool supporting member carried by said supporting structure, an angularly movable workpiece supporting member carried by said supporting structure, said members being in such relative positions as to allow the abrading tool carried by the tool supporting member, to be in co-axial relation with said surface of the workpiece when carried by the work supporting member, means for effecting relative rotation about the axis of the abrading tool between said members, means for effecting relative axial reciprocation between said members, restraining means operable to limit angular movement of the workpiece supporting member, sensing means carried by said restraining means for sensing the resistance to relative movement between the tool and the surface of the bore, and for developing a primary signal having a magnitude dependent upon the magnitude of the resistance offered by said restraining means, and means for adjusting the effective diameter of the tool with reference to said primary signal.

2. A machine according to claim 1 in which the tool supporting member comprises a rotary spindle carried in bearings mounted on said supporting structure, means carried by the spindle and disposed at one end of the spindle whereby the spindle can be rotated, and clamp means carried by the other end of the spindle whereby the tool can be clamped thereto.

3. A machine according to claim 2 in which said clamp means comprises a cap which is in screw thread engagement with the other end of the spindle, an inwardly extending annular flange defined by said cap and between which and the end of the spindle can be clamped a flange formed on the tool.

4. A machine according to claim 3 including an axial bore formed in the spindle, an axially movable operating rod located in said bore, said rod at one end projecting beyond said one end of the spindle and at its other end defining a contoured surface which upon movement of the rod co-operates with surfaces on the tool to effect expansion or contraction of the working surfaces of the tool.

5. A machine according to claim 4 including an actuating device operatively connected to said one end of the rod to effect axial movement of the rod.

6. A machine according to claim 5 in which said actuating device includes a fluid pressure operable piston cylinder combination, a gripping device including a collet for engaging and gripping the rod, for connecting the piston cylinder combination to the rod, and bearings intermediate the collet and another part of the gripping device, said bearings allowing relative angular movement between the collet and said part while preventing relative axial movement therebetween.

7. A machine according to claim 6 in which the workpiece supporting member includes a holder for the workpiece, said holder being mounted in bearings carried by the supporting structure, the bearings restraining the work supporting member against axial movement, said sensing means being in the form of an electrical strain gauge which acts to restrain angular movement of the holder in its bearings.

8. A machine according to claim 7 in which the holder includes a fluid pressure operable piston operable to cause a workpiece to be retained in the holder.

9. A machine according to claim 8 in which the holder comprises a pair of jaw members movable by said piston to grip the workpiece, a resilient lining on the portion of the jaw members which contact the workpiece, said resilient lining serving to prevent axial or angular movement of the workpiece about the axis of rotation of the tool but allowing angular deviation between the axis of the workpiece and the axis about which the tool rotates.

10. A machine according to claim 1 including a carriage movable relative to the supporting structure, said workpiece holder being carried by said carriage and in which the means for effecting relative axial reciprocation between the members comprises an actuator which is coupled to said carriage.

11. A machine as claimed in claim 10 in which the actuator comprises a hydraulic piston and cylinder unit.

* * * * *